(12) United States Patent
Kuzik et al.

(10) Patent No.: US 6,781,515 B2
(45) Date of Patent: Aug. 24, 2004

(54) CONVEYOR BELT FAULT DETECTION APPARATUS AND METHOD

(75) Inventors: Larry Kuzik, Surrey (CA); Ronald Ninnis, Vancouver (CA)

(73) Assignee: Canada Conveyor Belt., Co., Ltd., Surrey (CA)

( * ) Notice: Subject to any disclaimer, the term of this patent is extended or adjusted under 35 U.S.C. 154(b) by 298 days.

(21) Appl. No.: 09/992,282

(22) Filed: Nov. 16, 2001

(65) Prior Publication Data

US 2002/0145529 A1 Oct. 10, 2002

Related U.S. Application Data

(60) Provisional application No. 60/249,729, filed on Nov. 16, 2000.

(51) Int. Cl.[7] .............................................. G08B 21/00
(52) U.S. Cl. .................. 340/676; 340/679; 198/810.02; 198/847
(58) Field of Search ................................. 340/676, 635, 340/657, 679, 673, 674; 198/810.02, 844.1, 847, 502.1; 330/144, 86

(56) References Cited

U.S. PATENT DOCUMENTS

| | | | | |
|---|---|---|---|---|
| 3,656,137 A | * | 4/1972 | Ratz | 340/676 |
| 4,464,654 A | * | 8/1984 | Klein | 198/810.02 |
| 6,264,577 B1 | * | 7/2001 | Hutchins | 474/106 |

* cited by examiner

Primary Examiner—Jeffery Hofsass
Assistant Examiner—Hung Nguyen
(74) Attorney, Agent, or Firm—Robert B. Hughes; Hughes Law Firm, PLLC

(57) ABSTRACT

A fault-monitoring system for a large industrial conveyor belt to detect rips or other faults. There are fault-sensing units in the belt, each comprising a conductive loop extending across the belt and a sensing circuit. First and second frequency signals are directed to the fault sensor and the fault-responsive circuit sends a response of a frequency to indicate either a fault condition or a no-fault condition. Thus, the response from the fault sensor is either an "I am here and I am okay" or "I am here, but there is a fault in the belt" signal.

20 Claims, 11 Drawing Sheets

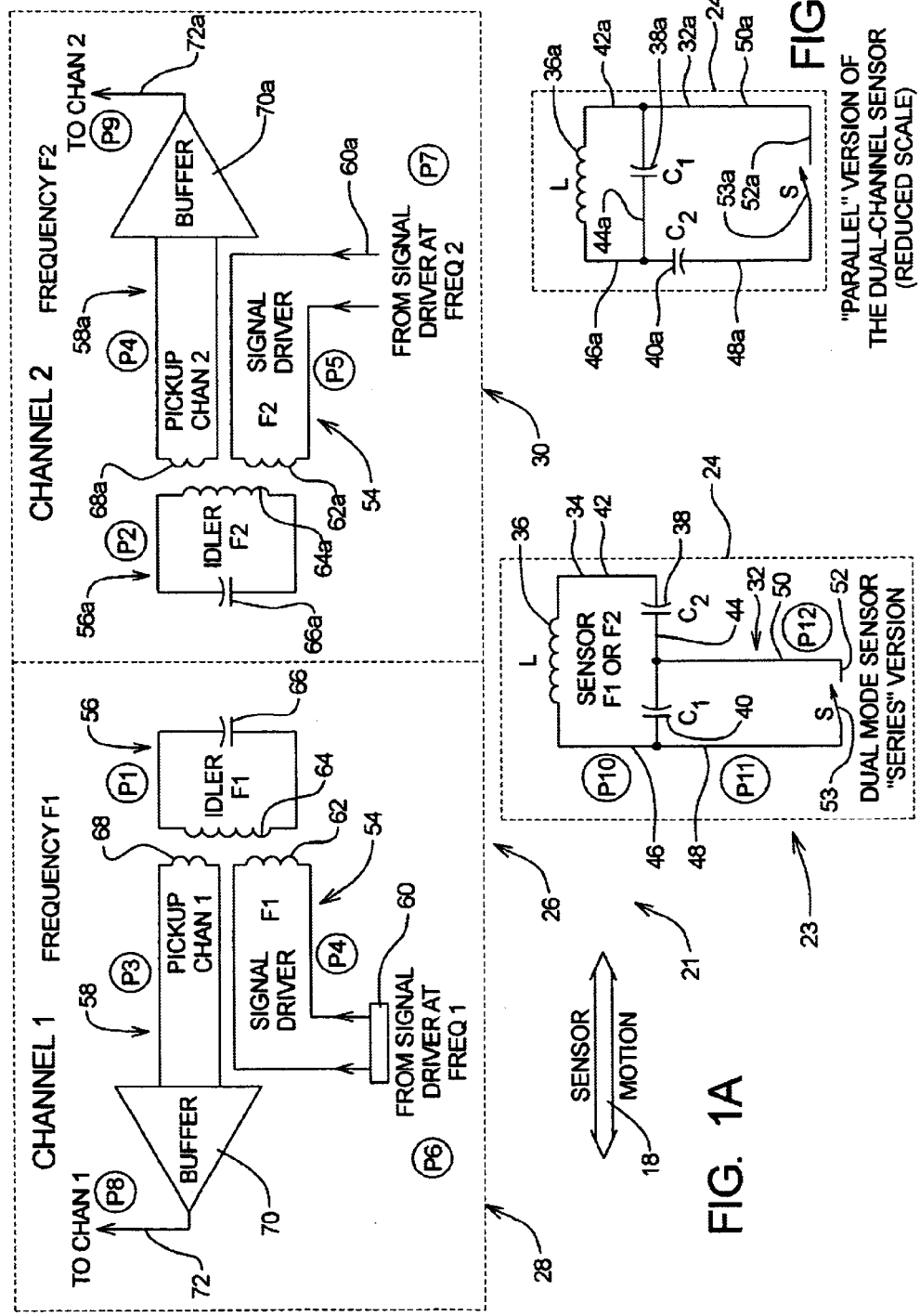

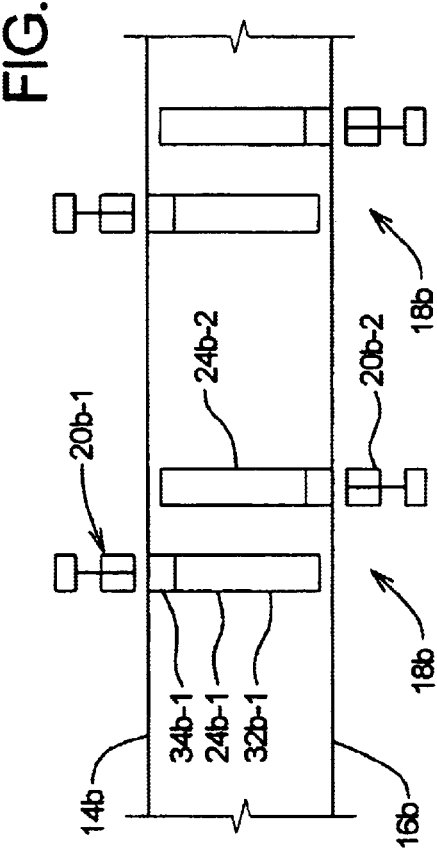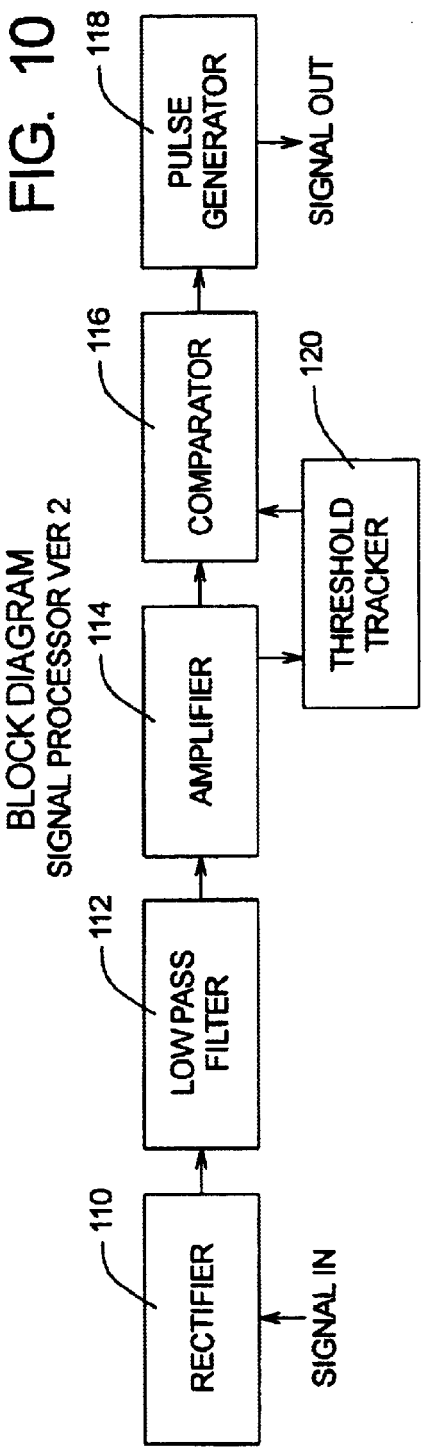

2

CONVEYOR BELT FAULT DETECTION APPARATUS AND METHOD

RELATED APPLICATIONS

This application claims priority benefit of U.S. Provisional Serial Number 60/249,729, filed Nov. 16, 2000.

BACKGROUND OF THE INVENTION a) Field of the Invention

The present invention relates to a fault detection system and method, and more particularly to a fault detection system for a movable elongate member, such as a conveyor belt by which rips or other faults in the belt can be detected.

b) Background Art

Large industrial conveyor belts have a variety of applications such as in commercial mining operations or other situations where large quantities of ore or other material are to be moved from one location to another. Such belts are commonly made of rubber or synthetic rubber, and steel reinforcing cables are generally embedded in the belt and extend along the length thereof. It sometimes happens that rips extending along the lengthwise axis of the belt will develop, or other damage to the belt will occur. It is highly desirable that such rips or damage be identified at an early time, so that timely remedial steps can be taken.

One method which has been employed to detect such rips or other damages is to embed in the belt a rectangular loop of wire or other conductor so as to extend across width of the belt and enclose a significant area of the belt, and adding a sensing apparatus of some kind which detects when the wire is broken.

SUMMARY OF THE INVENTION

It is the object of the present invention to provide a fault-monitoring and sensing system, particularly adapted for use in such large industrial conveyor belts, with this system having a desirable balance of operating features. More particularly, in the system of the present invention, three situations are able to be detected at spaced detecting locations along the length of the belt. (In the following text the fault to be detected will sometimes be designated as a "rip" along a lengthwise axis, with the understanding that this is meant to include other types of damage.) The three situations to be detected are:

i. a satisfactory condition where the fault detector at a detecting location in the belt, transmits an "okay" signal which indicates that the fault detector is functioning and no rip has been detected;

ii. a fault-indicating condition where a rip has occurred in the belt, and the sensor is operating to indicate this rip or other damage;

iii. a condition where no indicating signal is transmitted when one would be expected, which would indicate that the sensing apparatus at that location is damaged and is not capable of indicating either no damage or a damaged condition.

Thus, one of the major benefits of this system is that it has been made so as to be "self-diagnostic", in that it has a means for providing continuous feedback on the condition of the fault detectors themselves, in addition to ascertaining the fault or no-fault condition of the belt as indicated by the sensor.

The conveyor belt has a longitudinal axis, a transverse axis, and first and second side portions.

The monitoring system comprises first a fault-sensing system, comprising a plurality of fault-sensing units. These are located at spaced fault-sensing locations along the longitudinal axis of the belt.

Each of the fault-sensing units comprises an electrically conductive fault-responsive component which extends between the side portions of the belt and which has an intact condition in a belt no-fault condition, and a non-intact condition in a belt fault condition. There is also a fault-sensing component that comprises a fault-sensing circuit. The fault-sensing circuit is operatively connected to the fault-responsive component, and arranged to provide no-fault or fault responses corresponding to the intact and non-intact conditions, respectively.

The fault-monitoring section is arranged to transmit interrogating signals to the fault-sensing units and to receive the fault or no-fault responses from the sensing units. The fault-monitoring section in turn generates a reporting signal corresponding to the responses from the sensing unit.

Thus, as the belt travels and the fault-sensing units pass by the fault-monitoring section, the fault or no-fault condition of the belt at the location of the fault-sensing units is detected.

In a preferred embodiment, the fault-responsive component provides an electrically conductive path extending between the first and second side portions of the belt and connecting to the fault-sensing circuit. The fault-sensing circuit has a first operating mode which functions with the conductive path of the fault-responsive component intact to provide no-fault responses, and having a second operating mode which functions with the conductive path in the fault-responsive component in a non-intact condition to provide a fault response.

The electrically conductive fault-responsive component comprises a conductive loop having two end connecting portions which connect to the fault-sensing circuit. Thus, there is formed a bypass connection, and with the fault-responsive component in its non-intact condition, the electrically conductive path is interrupted and the bypass connection becomes nonfunctional.

In a preferred form, the bypass connection is in parallel with at least one circuit component of the fault-sensing circuit. In the specific embodiment, the fault-sensing circuit comprises, at least in part, a resonant circuit portion which operates at a first resonant frequency with the fault-responsive component in the intact condition, and operates at a second resonant frequency with the fault-responsive component in the second non-intact condition. The fault-monitoring section comprises a receiving/transmitting portion which is responsive to the first and second frequencies in order to generate a reporting signal corresponding to the frequency of the response received from the fault-receiving component.

In a specific configuration, the fault-sensing circuit comprises a coil portion and a capacitance portion. The electrically conductive fault-responsive component has an operative connection with at least said capacitance portion in a manner that in the no-fault condition, the capacitance portion has a first capacitance value, and in the fault condition, the capacitance portion has a second capacitance value, in order to provide the first and second frequency outputs.

In one arrangement, the electrically conductive fault-responsive component is in series with at least one capacitor of the capacitance portion. In another arrangement, the electrically conductive fault-responsive component is in parallel with at least one capacitor of the capacitance portion.

In the preferred form, the fault-sensing units are passive, and the monitoring section comprises a detecting section arranged to transmit an interrogating signal which energizes the fault-sensing unit. The interrogating signal is arranged to energize the fault-sensing circuit in each of the no-fault operating modes of the fault-sensing circuit and in the fault operating mode of the fault-sensing circuit to cause the no-fault or fault response.

The interrogating signal comprises first and second signal components matching characteristics of the fault-sensing circuit in a no-fault or fault-responding operating mode to generate the no-fault or fault condition. More specifically, the detecting section is arranged to transmit the interrogating signal having first and second frequency components to energize the fault-detecting circuit operating in first or second frequency modes to transmit a no-fault response or a fault response corresponding to the first and second frequencies, respectively.

In a preferred form, the fault-monitoring section is arranged to transmit the interrogating signal or signals as a wave form having at least first and second frequency components, and said fault-sensing circuit has a resonant frequency portion which operates at a first resonant frequency with the fault-responsive component in the intact condition, and operates at a second resonant frequency with the fault-responsive component in the non-intact condition.

The system is characterized so that when on of the fault-sensing units is in proximity to the fault-monitoring section, and when the fault-sensing circuit is operating at the first resonant frequency with the fault-responsive component in the intact condition, the resonant circuit portion draws energy from the first frequency component of the fault-monitoring sections to provide the response. When the fault-sensing circuitry is operating at the second resonant frequency, with the fault-responsive component in the non-intact condition, energy is drawn from the second frequency component of the fault-monitoring section to provide the response.

The fault-monitoring section is arranged to generate a reporting signal of the no-fault or fault-condition in response to the change in the energy level of either the first or second frequency components of the fault-monitoring section.

In the preferred form of the present invention, the fault-monitoring section comprises a detecting section having first and second detecting subsections, with one of said subsections generating an interrogating wave form of the first frequency, and the second subsection generating an interrogating wave form of the second frequency. Each of these subsections comprises a signal generator which produces signal pulses that are directed to a drive coil. The drive coil in turn is coupled to an idler section that comprises an idler coil and a capacitor. A pickup coil is in turn coupled to the idler coil 64 and in turn is operatively connected to a signal processing section.

In the method of the present invention, there is first positioned a plurality of the fault-sensing units at spaced fault-sensing locations along the longitudinal axis of the belt. The belt is moved along a belt-traveling path aligned with the longitudinal axis, with the fault-sensing components being positioned to move along a monitoring path.

The fault-monitoring section is positioned at a monitoring location adjacent to the monitoring path. The fault-monitoring section transmits the interrogating signals to the fault-sensing units as the units are passing by the monitoring location to initiate and receive the fault or no-fault responses from the sensing unit. These are in turn directed to a processing unit to generate a reporting signal corresponding to response or responses from the sensing unit.

Other features of the present invention will be apparent from the following detailed description.

BRIEF DESCRIPTION OF THE DRAWINGS

FIG. 1A is a circuit diagram of the fault detection system of the present invention;

FIG. 1B shows an alternative design of the fault circuit of FIG. 1A;

FIG. 9 is a schematic drawing similar to FIG. 1, showing a second embodiment of the present invention;

FIG. 10 is a block diagram illustrating a third embodiment of the present invention;

DETAILED DESCRIPTION OF THE PREFERRED EMBODIMENTS

Figure 1:
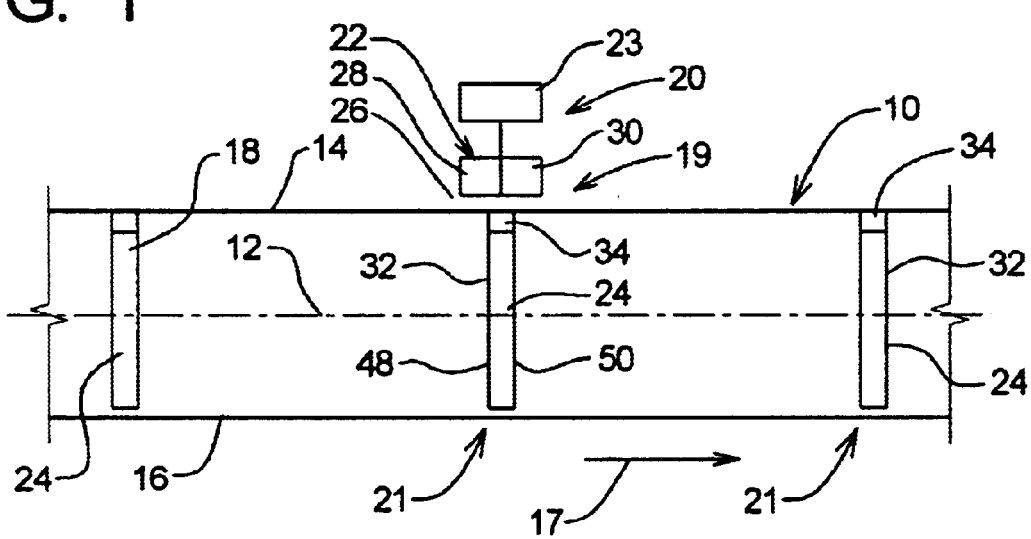
FIG. 1 is a somewhat schematic view illustrating a conveyor belt in which the system of the present invention is incorporated.

With reference to FIG. 1, there is shown a conveyor belt 10, (in this instance a large industrial conveyor belt), which has a lengthwise axis 12, and first and second side portions 14 and 16. As shown herein, the belt is travelling along a path of travel indicated at 17, and there is a plurality of fault-sensing locations 18 at which the condition of the belt is to be ascertained.

The overall system 19 of the present invention comprises a fault-monitoring section 20 in a fault-sensing section 21. The fault-monitoring section further comprises a fault-detecting section 22 in a signal processing section 23. The fault-sensing section 21 comprises a plurality of fault sensors 24, each located at a respective fault-sensing location 18 along the belt. The fault-detecting section 22 is located at a fault-detecting location 26. This fault-detecting section 22 in turn comprises first and second detecting subsections 28 and 30.

The fault sensors 24 are equally spaced along the belt length. In normal operation as each fault passes by the detecting location 27, each fault sensor's count (order in sequence) and time of arrival is recorded at the detecting location 26. When the time of arrival between successive fault sensors 24 is roughly double the normal time separation, the monitoring apparatus would determine that the lack of a signal from that particular fault sensor 24, which should have been detected, would indicate that that particular fault sensor 24 had been damaged. This result is recorded and when that same fault sensor 24 again passes by the detecting location 26, the repeated absence of the signal will be considered as a "no signal is expected". Thus, as indicated previously, it is possible with the present system to distinguish between three sensor states for any fault-sensing location, namely:

a) the belt is okay at that location;

b) the belt is damaged at that location;

c) the fault sensor at that location is not operating.

The overall circuitry of the fault-detecting section 22 is shown in FIG. 1A but, before describing this circuitry in detail, there will be a brief description of the basic operation of the present invention.

Each of the fault sensors 24 will respond to two different frequency signals from the fault-detecting section 22, namely a first signal of one frequency in a condition where no fault is ascertained at that particular location 18, and a signal of a second frequency to which the fault sensor 24 will respond when a fault is present. Then when the fault sensor 24 does not respond to either signal, then this would indicate that the fault sensor 24 is inoperative and is not sensing either a fault or no-fault condition.

To describe now the fault sensor 24, there are two main subsections, namely a fault break indicating electrically conductive member or component in the form of a loop section 32 and a sensing section 34. The sensing section 34 in turn comprises a fault/no fault-sensing circuit 35 that in turn comprises a sensing coil 36 and two capacitors 38 and 40 connected in series.

A first line 42 connects one end of the coil 36 to the capacitor 38; a second line 44 connects the two capacitors 38 and 40 to one another, and a third line 46 connects the capacitor 40 to the other end of the coil 36.

The loop section 32 comprises two lines 48 and 50 which extend from one side 14 of the belt 10 to the other side 16. At the side 16, the lines 48 and 50 connect at 52, and at the connection 52 there is schematically shown a switch 53 which (primarily for purposes of explanation) represents in its closed position a condition where the loop section 32 is intact (i.e. without a break) and in the open position to illustrate that somewhere along the length of the loop section 32 there is a break (which would occur usually in one or the other or both of the lines 48 and 50). The ends of the two lines 48 and 50 of the loop section 32 connect at the side location 14 so that the one line 50 connects to the line 44 between the two capacitors 38 and 40, while the line 48 connects to the line 46 which extends from the capacitor 40 to the related end of the sensing coil 36.

To describe the operation of the fault sensor 24, functionally, it will become apparent that this fault sensor 24 comprises a dual mode sensor consisting of two resonant circuits selectable by the "imaginary" or "schematic switch" (shown at 53); with the "switch" simply indicating schematically whether there is or is not a break in the entire loop section 32 (as indicated previously). In other words, when the loop section 32 is intact, the "switch" 53 is closed, and when the loop section 32 is broken, the "switch" 53 is open. The loop section 32 intact forms a shunt across the capacitor 40, effectively removing it from the circuit.

The remaining capacitor 38 forms, along with the sensor coil 36, a resonant circuit with the resonant frequency:

$$f_1 = 1/(2\pi L\ C_2).$$

When the loop section 32 is broken, the shunt across the capacitor 40 is removed, and we then have the capacitor 40 being in series with the capacitor 38 forming an equivalent capacitance:

$$C_{eq} = C_1 C_2 / (C_1 + C_2)$$

and the resonant frequency becomes:

$$f_2 = 1/(2\pi L\ C_{eq}).$$

Since $C_{eq}$ is less than either of the two capacitors 40 or 38 alone, the higher frequency occurs when the loop is broken. In a preferred embodiment, frequencies in the order of 500 kHz and 800 kHz would be used.

An alternative embodiment of the fault sensor is shown in FIG. 1B. Components of this alternative embodiment which correspond generally with those of the first embodiment in FIG. 1 will be given like numerical designations with an "a" suffix distinguishing those of this alternative embodiment.

As in the first embodiment, there is a loop section 32a comprising the two lines 48a and 50a and the switch shown schematically at 53a representing the condition where the loop section 32a is either intact or broken. Likewise, there are the two capacitors 38a and 40a and the sensing coil 36a.

However, it can be seen that the two capacitors 38a and 40a are arranged so that when the loop section 32a is intact (i.e. it is unbroken so that the schematic switch at 53a is closed) the capacitor 40a is connected in the circuit, and thus the two capacitors 38a and 40a operate in parallel. It can also be seen that when the loop section 32a is broken (i.e. the schematic switch 53a thus being open) the capacitor 40a is disconnected from the circuit. With both capacitors 38a and 48a operating in parallel, the equivalent capacitance $C_{eq} = C_1 + C_2$. When the loop section 32a is broken, then $C_{eq}$ is greater than either $C_1$ or $C_2$ so that the resonant frequency obtained is higher than when the loop is broken. Thus, both configurations of the fault sensor 24 or 24a function so that the resonant frequency obtained is higher when the loop 32 or 32a is broken.

To turn our attention now to the detecting section 22, as indicated earlier, this comprises the two detecting subsections 28 and 30. These two detecting subsections 28 and 30 are substantially identical to one another, except frequencies of the output signals of the two detecting subsections 28 and 30 as well as the resonant frequencies, F1 and F2, of the idler circuits are different. Accordingly, only the detecting subsection 28 will be described, with the understanding that this description will apply as well to the second detecting section 30, except for the difference in the frequencies of the generated and detected signals.

The detecting section 22 comprises a driver section 54, an idler section 56 and a pick-up section 58. The driver section 54 comprises a signal generator 60 and a drive coil 62 which receives the signal from the signal generator 60. The idler section 56 comprises an idler coil 64 and a capacitor 66, with the coil 64 and the capacitor 66 forming a resonant circuit which has a resonant frequency $f_1$. The idler coil 64 is coupled to the drive coil 62 so that when the signal is transmitted to the drive coil 62 it induces a corresponding signal in the idler coil 64 of the idler section 56.

The pick-up section 58 comprises a pick-up coil 68, which is coupled to the idler coil 64, with the opposite ends of the coil 68 connecting to a buffer 70. The buffer 70 in turn transmits its signal to a channel input 72 which in turn is connected to the signal processing system 22.

With the two fault detector subsections 28 and 30 being substantially identical except for the frequency generated, there will be no detailed description of the subsection 30. Rather, the components in subsection 30 will be given numerical designations the same as their corresponding components in subsection 28, with an "a" suffix distinguishing those in subsection 30.

To describe the operation of the present invention, we'll first assume that the resonant frequency of the idler section 56 of the detecting subsection 28 is the same as the resonant frequency of each fault sensor 24 when the fault indicator loop 32 is intact, and that the resonant frequency of the idler section 56a of the subsection 30 has a resonant frequency the same as the fault sensor 24 in the fault condition where one or the other (or both) of the lines 48 and 50 is or are broken.

Each of the signal generators 60 and 60a is constantly generating a waveform or signal through its drive coil 62 or 62a to each of the idler sections 56 and 56a. Thus, each idler section 56 and 56a will in turn normally be oscillating at its own frequency, and these regular oscillating signals are being picked up or monitored by the fault-monitoring section 20. It is only when the signal from one or the other of the idler sections 56 and 56a is attenuated that the signal processing system recognizes that one of the fault sensors 24 is passing by. Thus, when that attenuated signal is received from the first detecting subsection 28, this will be interpreted by the signal processing system 22 that the fault detector is telling the signal analyzer that, "I am here, and my loop section 32 is still intact. So there is no fault at this location". But, when the signal from the fault-detecting subsection 30 is attenuated, the fault sensor 24 is telling the signal processing system, "I am here, and my loop section 32 is broken. So there is likely a fault at this location".

To describe this in more detail, in the situation where the fault sensor 24 is intact, as the fault sensor 24 passes by the first detecting subsection 28, the oscillating current in the idler section 58 will induce a corresponding current in the now adjacent sensor coil 36 of the fault sensor 24 (which has the same resonant frequency as the idler circuit) so that the sensing section 34 will draw energy from the idler circuit 56, to diminish the current, in the idler coil 64, finally attenuating the signal picked up by the coil 68 and presented at the channel output 72. This signal change will be processed by the signal processing section 23 and will indicate that the fault sensor 24 is in a no-fault condition (i.e. the loop section 32 is intact).

Then the fault sensor 24 (which is intact) passes by the second detecting subsection 30. When the sensing section 34 of the fault sensor 24 passes adjacent to the idler coil 64a, the oscillating current that is generated in the idler coil 64a of the second detecting subsection 30, with the fault sensor 24 being intact, will differ from the resonant frequency of the idler section 56a. Therefore, no significant oscillating current will be generated in coil 36 of the sensing section 34, and the oscillating current in the idler section 56a will not be attenuated. Thus, signal will pass through the buffer 70a and through the signal processing system 74 will be unchanged. The net effect is that the signal processing system has heard an, "I'm okay" signal from the detecting subsection 28 and nothing from the adjacent detecting subsection 30.

Now let us take the second situation where there is a rip or other fault in the belt 10 at the location of the fault sensor 24 and the fault sensor 24 is again first passing by the first detecting subsection 28. Since, the loop section 32 has a break in one or other of the wires 48 or 50, the resonant frequency of the sensing section 34 will be different from the resonant frequency of the idler section 56 of the detecting subsection 28. Thus, there will be no attenuation of the regularly delivered signals from the driver section 54, and the signal processing system will not sense any change in the strength of the oscillating pulses from the detecting subsection 28.

Then this same fault sensor 24, (having a broken loop 32) passes adjacent to the second detecting subsection 30. The resonant frequency of the idler section 56a of the detecting subsection 30 will have the same resonant frequency as that of the fault sensor 24. The reason for this is that with there being a break in one or other of the wires 48 or 50, the two capacitors 38 and 40 are now in series, thus changing the resonant frequency of the sensing section 34 so as to be equal to the resonant frequency of the idler section 56a. Now the signal in the idler section 56a will be attenuated as the sensing section 34 of the nearby fault sensor 24 receives its share of the energy from the idler section 56a. This attenuated signal will be delivered to the pick-up coil 68a and thence to the signal processing system 22 which will immediately sense that a fault signal has been transmitted to it.

Now let's take a third situation, and this is where one of the sensing sections 34 is damaged so that it will not respond to the oscillating signal of either of the detecting subsections 28 or 30. In this instance, the signal processing section 23 would sense the increased time lapse between the signals received. In the operation of these large industrial conveyor belts, a significant change in velocity does not occur immediately, but only after the belt has probably traveled for several hundred feet. Accordingly, this increase in lapse in time where one of the fault sensors 24 is sending no signal at all would be sensed, and this in turn would be recorded in the signal processing section 23 where it would be recognized that at the particular location 18 the fault sensor 24 is not operative.

Figure 2:
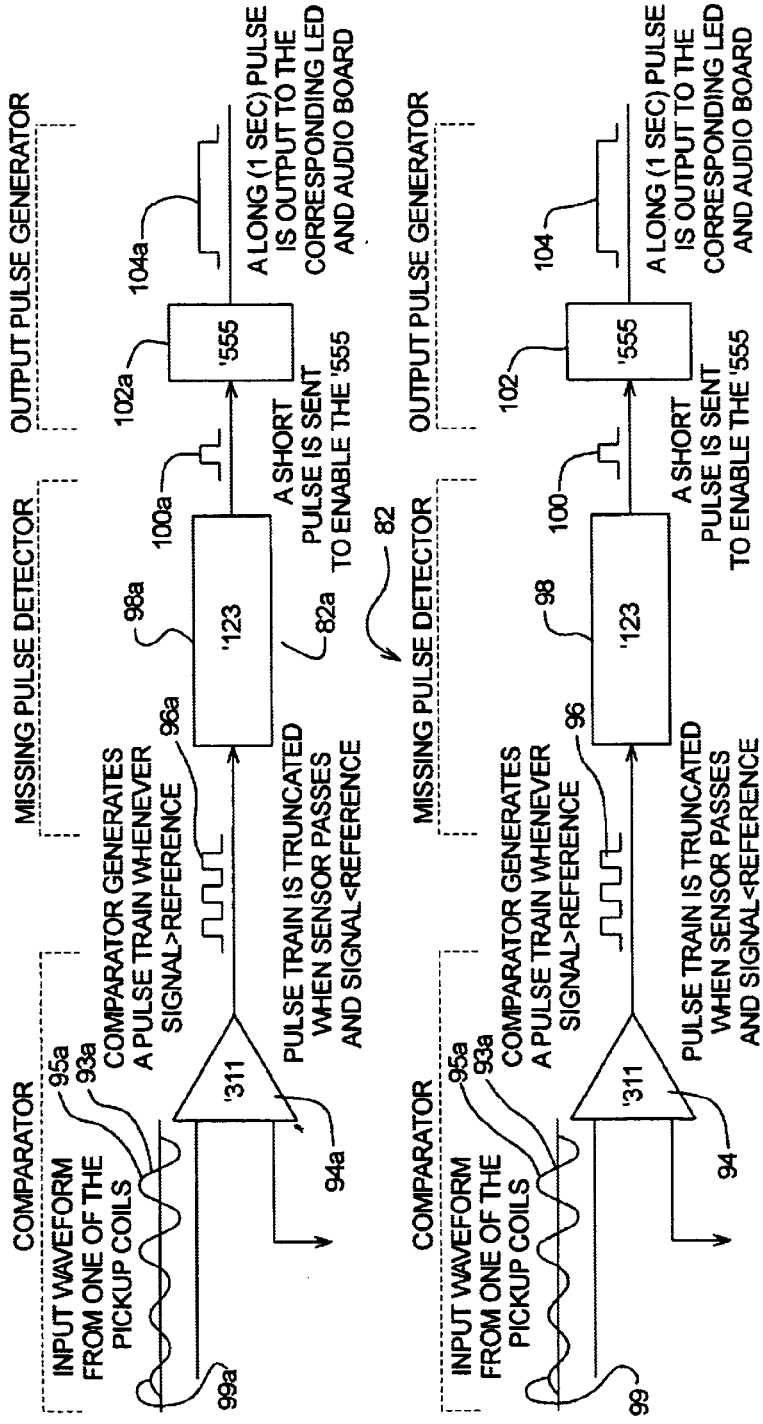
FIG. 2 is a somewhat schematic circuit diagram of a signal processing system used in the present invention.

In FIG. 2, there is a schematic diagram of the main components of the signal processing system 22. There is a first signal processing section 82 which processes the signal from the detecting subsection 28, and a second signal processing section 84 which processes the signals from the second detecting subsection 30. Since these two processing sections 82 and 84 are substantially the same, only the first processing section 82 will be described in any detail, it being understood that the second processing section 84 is substantially identical. The components of the second processing section 84 which are the same as (or corresponding to) the components of the first section 82, will be given like numerical designations, with an "a" suffix distinguishing those of the second section 84.

In the upper part of FIG. 2 there is shown at 86 the input signal, which is typical for both of the detecting subsections 28 and 30. As indicated previously, when the fault sensor 24 is in a no-fault condition and is passing by the subsection 28, because of the interaction of the idler coil 64 with the sensing coil 36, the oscillating current in the idler section 56 will have some of its energy shared by the oscillating current generated in the sensing section 34. The result is that there is a waveform 86 generated where there is a higher amplitude portion 88 resulting from the unattenuated signals that are regularly transmitted from the subsection 28, followed by an attenuated signal portion 90 during the time the sensor is passing the idler site. There is a reference voltage applied at 92, and it can be seen that the unattenuated signal portion 88 rises above the reference voltage 92 while the attenuated signal 90 is below that reference level 92. The same pattern of pulses is generated by the second detecting subsection 30 when the loop 32 of the fault sensor 24 is broken.

In the first processing section 82, the signal 93 from the detecting subsection 28 is directed to a comparator 94, and also the reference signal 92 is directed to this same comparator 94. When the signal 93 is at an amplitude as at 95, the comparator 94 sends a square wave signal 96 to a missing pulse detector 98, and this results in no output from the missing pulse detector 98.

However, when the lower amplitude signal portion 99 of the pulse 95 reaches the comparator 94, there is no square wave output 96, and the missing pulse detector 98 delivers a short pulse 100 to an output pulse generator 102 which in turn transmits a longer pulse 104 which is an, "I am here, and I am okay" signal to activate a green LED and also to activate an audio indicator which will develop a more "mild" tone indicating an "okay" situation.

On the other hand, when the signal processing section 84 receives the attenuated signal 99a, the same process occurs as described above with respect to the processing section 82. The result is that this activates a red LED, indicating the fault, and also sends a louder and more cautionary audio signal such as a periodic ringing sound.

Figure 3:
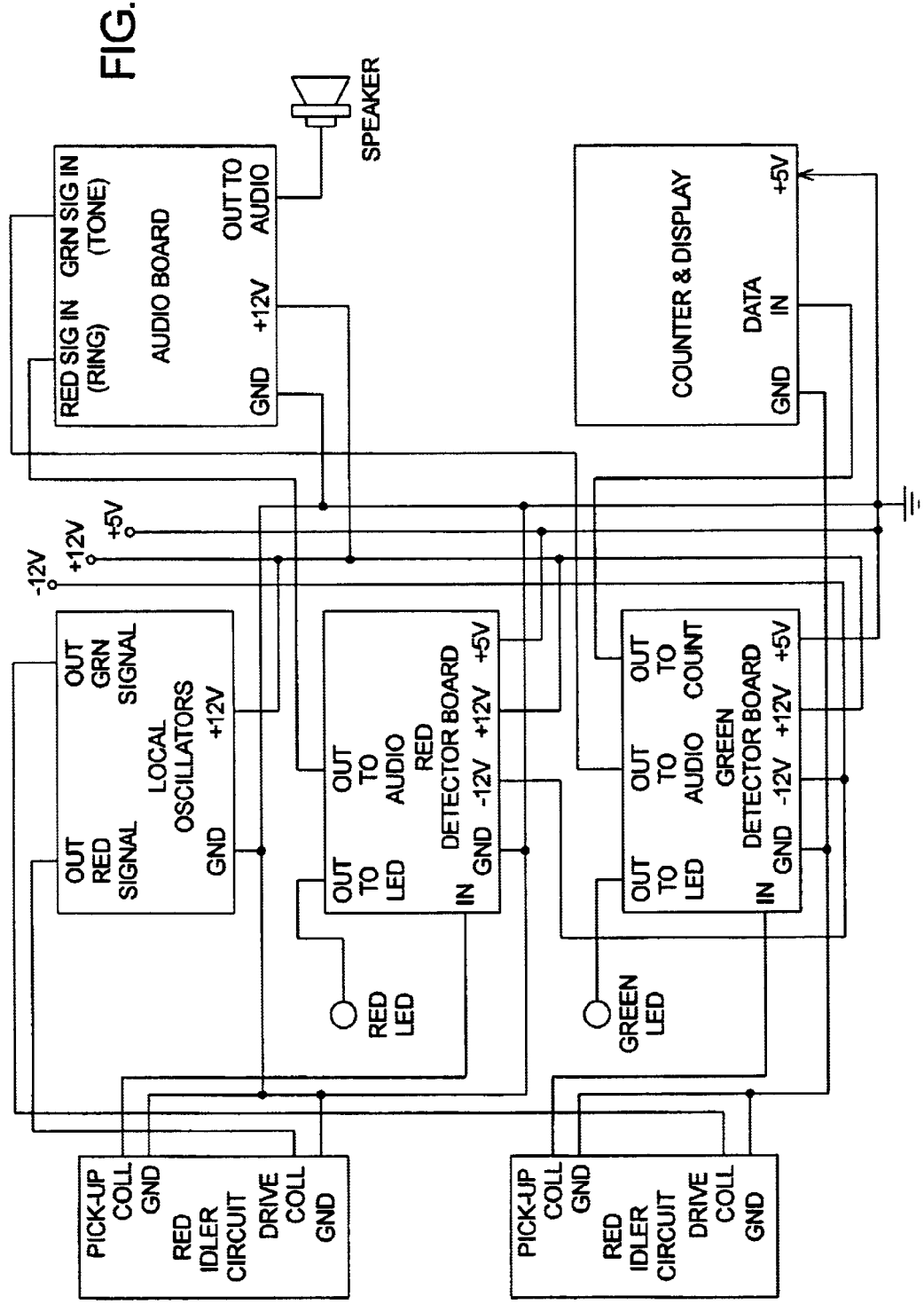
FIGS. 3 through 8 are circuit drawings and layouts disclosing more specific details of the components for a second embodiment of the present invention.

The circuits shown in FIGS. 3–8 illustrate components of the present invention more specifically. With reference to FIG. 3, the two rectangles on the left side of the page (with FIG. 3 is oriented so that the words can be read right side up) the "red idler circuit" and "green idler circuit" are block representations of the first and second fault-detecting subsections 28 and 30. The block at the top of the page entitled "local oscillators" directs continuous constant voltage wave forms to the red idler circuit and the green idler circuit. In the middle of the page there is the red detector board and the green detector board. These represent the circuit components shown in FIG. 2. The audio board is simply a block diagram of a audio output which would emit an audible tone either indicating "I am okay" or "I am not okay". The "counter & display" block at the lower right hand side would display either green or red signals on the LED's. Beyond that, in an actual commercial implementation, these signals would be directed into an alarm system, computer system or other system which would initiate the proper remedial action.

Figure 4:
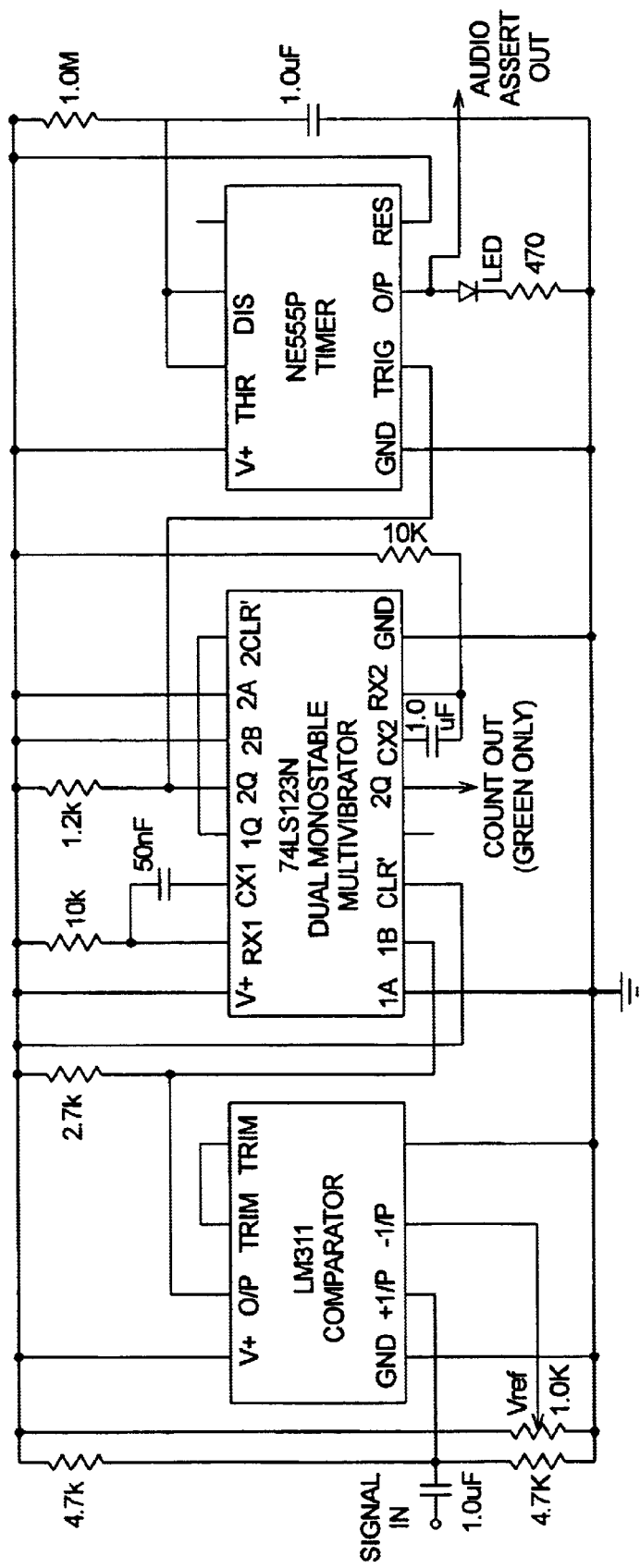

FIG. 4 is a schematic of the signal processing board, and there are two such processing boards, one for the fault-responsive system and the other for the no-fault-responsive system (i.e. the red and the green sections). These perform substantially the same functions as described previously in this text with regard to FIG. 2, so these will not be described in detail herein.

Figure 5:
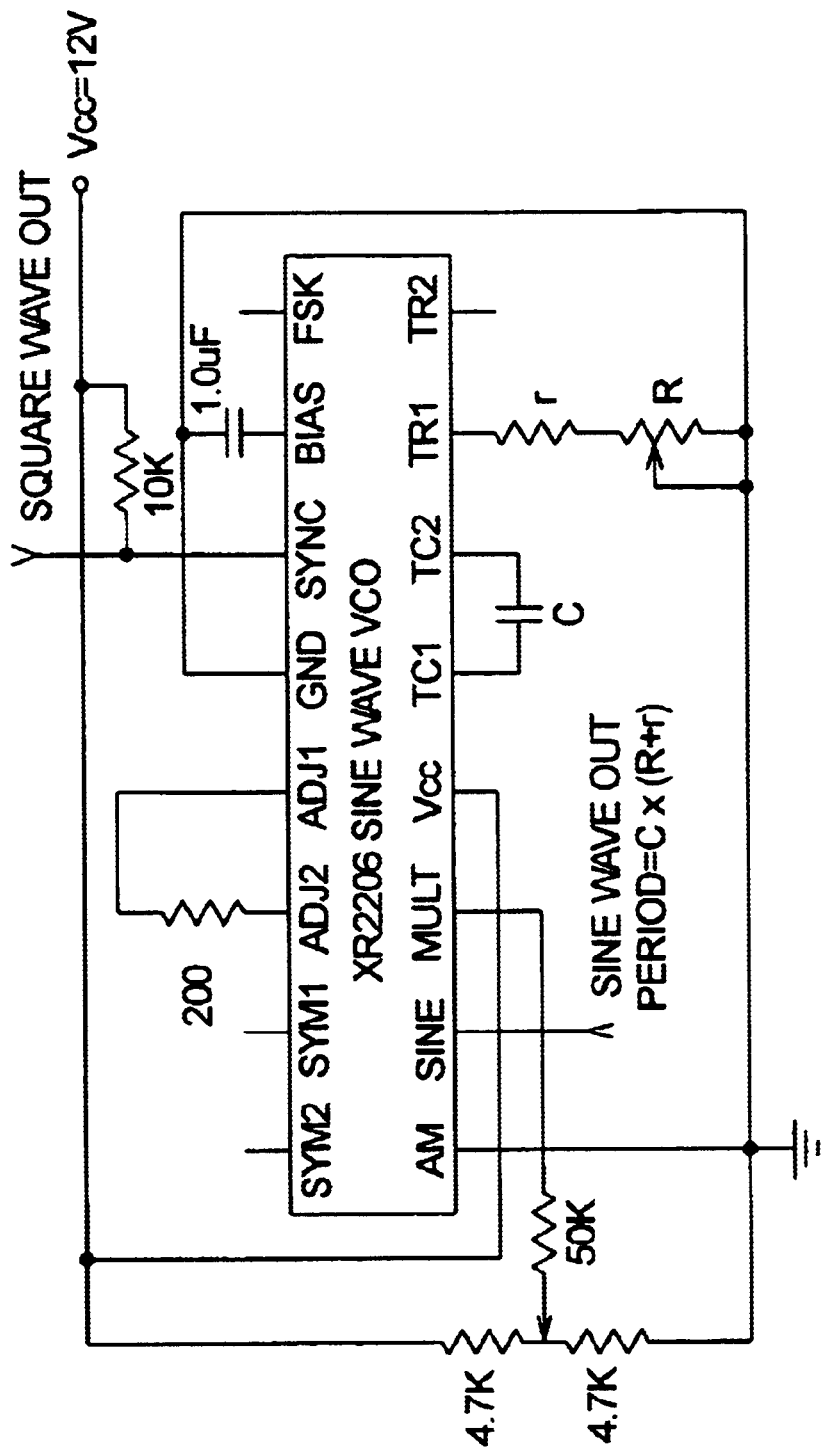

FIG. 5 is a circuit diagram for the signal generator which excites the idler coils. Thus, this would provide a continuous wave form to the drivers to energize the idler circuit for each of the two detecting subsections.

Figure 6:
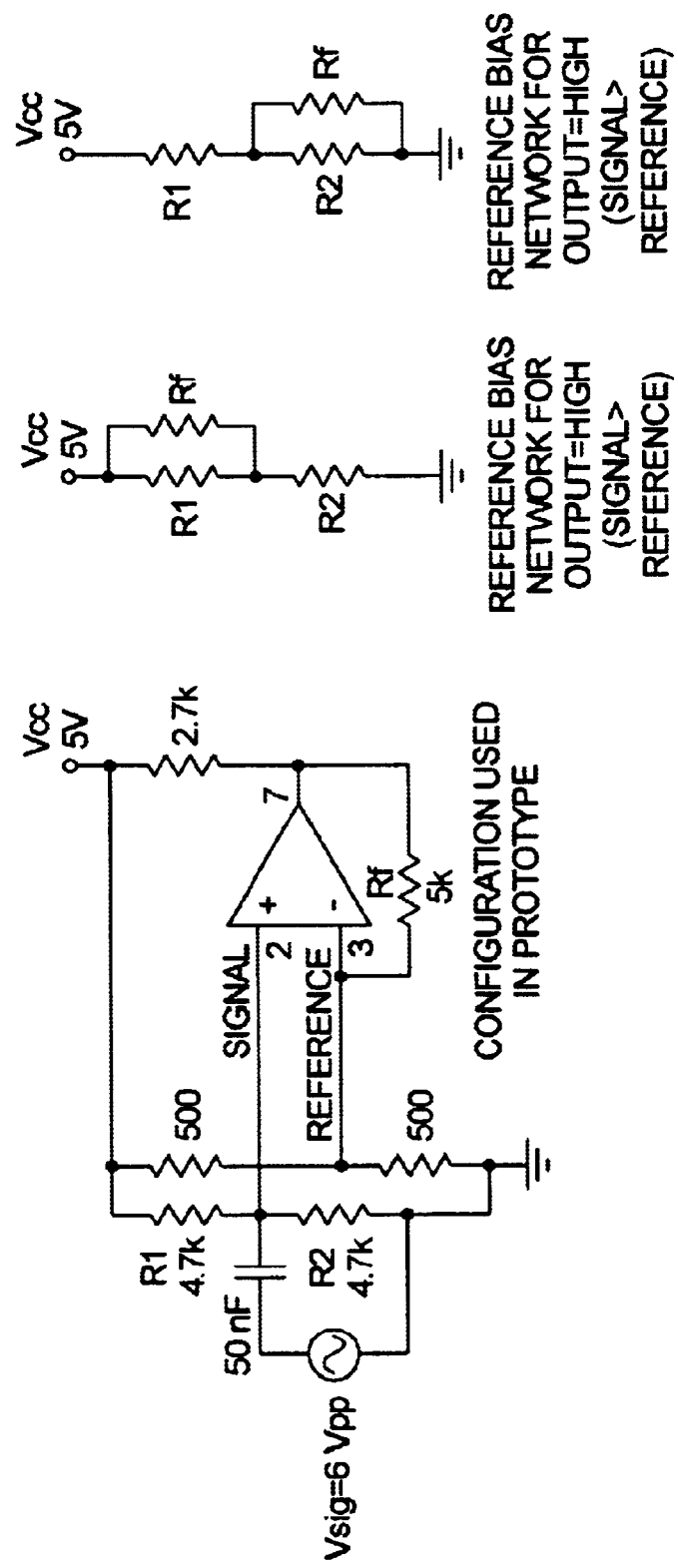

FIG. 6 simply shows a circuit which would eliminate spurious signals where the actual signal in the detecting system would be very close to the reference voltage.

Figure 7:
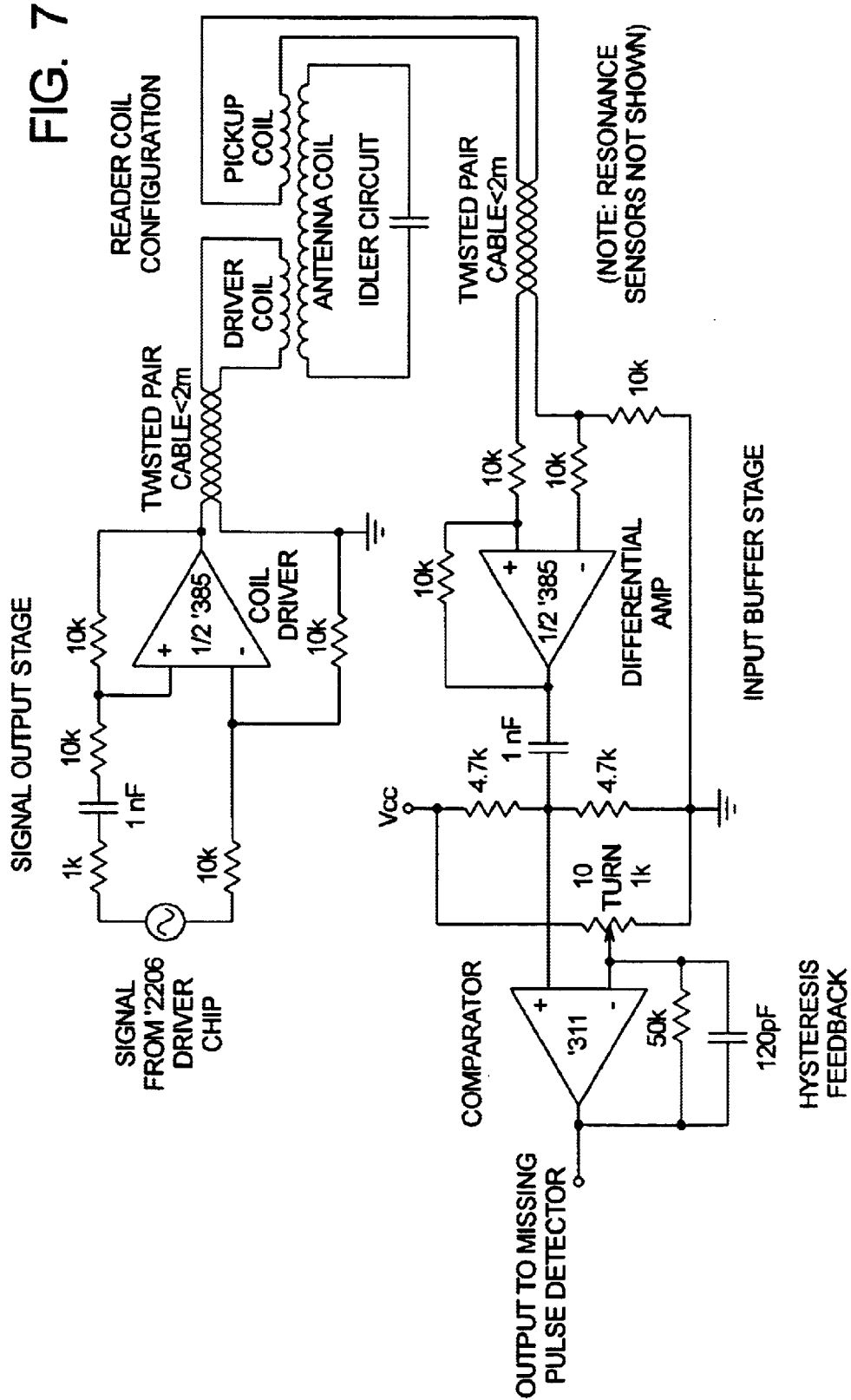

FIG. 7 is part of the signal processing board, and the input buffer stage is essentially an amplifier to strengthen the signal and also it matches impedances between the pick up coil and the comparator.

Then at the right side of the drawing, what is entitled the "Reader coil configuration" and this would readily be recognized as comprising the driver coil 62, the idler circuit 64 and the pick up coil 68 that are shown in FIG. 1A.

The signal output stage is part of the local oscillator (i.e. either the red signal oscillator or the green signal oscillator).

Figure 8:
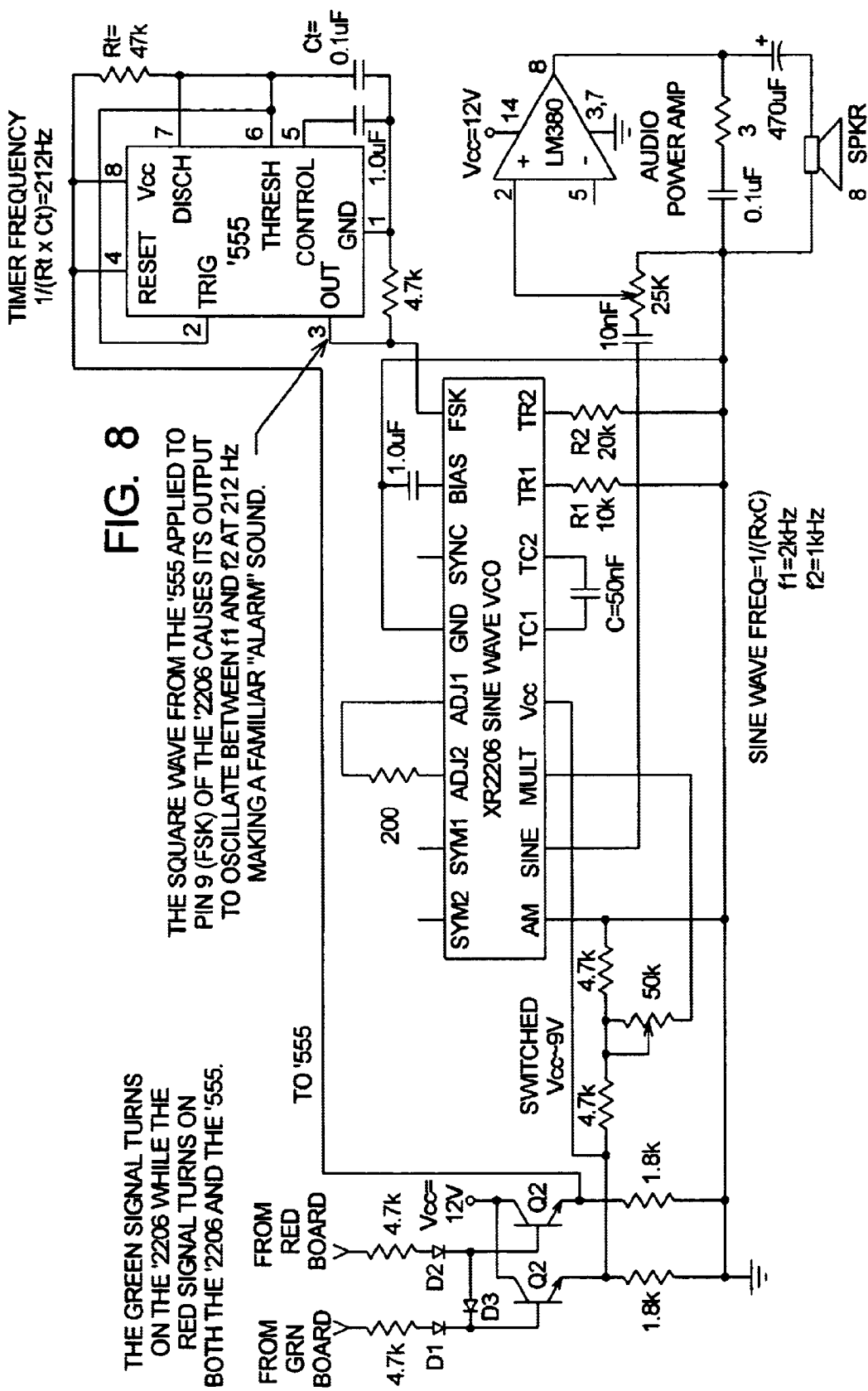

In FIG. 8, there is shown an audio circuit board which is the audio output shown in FIG. 3. A second embodiment of the present invention is illustrated in FIG. 9. Components of this second embodiment which are similar to components of the first embodiment will be like numerical designations, with a "b" suffix added to distinguish those of this second embodiment.

The second embodiment of FIG. 9 is substantially the same as the first embodiment of FIG. 1, except that at each false-sensing location 18b there is a pair of fault sensors 24b. Also, there are two monitoring sections 20b positioned on opposite sides of the belt 10b. To distinguish the various components, each pair of fault sensors 24 will be differentiated by one fault sensor 24b being designated 24b-1, and the second sensor being designated 24b-2. In like manner, the monitoring sections 20b will be designated as 20b-1 (the monitoring section 20b adjacent to the first side 14b), and the monitoring section 20b-2 (the monitoring section adjacent to the side 16b of the belt 10b). Thus, the first fault sensor 24b-1 of this second embodiment comprises the break indicating loop section 32b-1 and the sensing section 34b-1. These operate in the same manner as described previously with respect to the first embodiment. In like manner, the second fault sensor 24b-2 comprises the loop section 32b-2 and the fault sensor section 34b-224b-2, this fault sensor 24b-2 operates in substantially the same way as the other fault sensor 24b-1, and also the same as the fault sensors of the first embodiment. In like manner, the two monitoring sections 20b-1 and 20b-2 operate in the same manner.

There are several advantages to this arrangement. The first advantage (and possibly the most obvious advantage) is that this provides redundancy. Let us assume that one of the fault-sensing locations 18b is approaching the location of the two monitoring units 20b-1 and 20b-2. Let us further assume that the sensing section 34b-1 of the first fault sensor 24b-1 is faulty so that no signal is given. However, assuming that the other sensing section 34b-2 of the adjacent fault sensor 24b-2 is operative, then there will be transmitted either the fault or no fault signal to the second monitoring section 20b-2. This will not only provided needed information, but will also advise the signal processing unit (or the computer section connected thereto) that the other fault sensor 24b-1 is defective.

There is a second advantage, in that in some instances certain belt sections (or possibly entire belt) is mounted to the conveying system "backwards", in that the forward section is now at the rear, and the rear section is positioned forwardly. In the first embodiment, if this would occur, the sensing sections 34 would not be passing adjacent to the monitoring section 20. In this instance, with regard to the fault sensors 24b-1 and 24b-2, if the belt section of the belt 10b is inserted backwards, it would make absolutely no difference.

There is a third advantage, and this is that the need for a separate timer is substantially limited, since in most all instances, if one of the fault sensors 24b-1 or 24b-2 is not working, the other one would be operative so that the need to time the intervals relative to the velocity of the volt would be substantially eliminated (or at least substantially diminished). In FIG. 9, the two fault sensors 24b-1 and 24b-2 are shown clearly spaced from one another, relative to the spacing between the two fault-sensing locations 18b. In actual practice, these would be placed more closely together.

A third embodiment will now be described with reference to FIGS. 10, 11 and 12. This third embodiment incorporates the same system as in the first embodiment, except a different signal processor is employed instead of that shown in FIG. 2 as described in the text previously herein.

With reference to FIG. 10, this shows the signal processing systems for one of the two subsystems (i.e. the no-fault-signal processing system and the fault-signal processing system).

The signal from the related detecting subsection is first rectified in the rectifier 110 which takes the information out of the carrier signal. This low frequency signal is filtered in the low pass filter 112 to remove the noise in this signal. Then the output from the low pass filter is directed to the amplifier 114 to obtain use for operational signal levels.

Next, the amplified signal is directed to a comparator 116 which then sends out a pulse which is improved on in the pulse generator 118 as the last block. This output is the signal level which indicates either the no fault or fault condition.

It will also be noted that there is shown in the diagram of FIG. 10 a threshold tracker 120. The function of this will be described later herein. It should be understood that the circuitry shown in the block diagram of FIG. 10 is provided for each of the "red" and "green" systems, so that if the "green" system picks up the "I am okay" signal, this will be processed in its related blocked diagram, shown in FIG. 10. On the other hand, if the red subsystem picks up the signal from the false sensor 24, then that signal will be in its related block diagram of FIG. 10 in the "red" system and indicate the "I am here, but I am not okay" signal.

Figure 11:
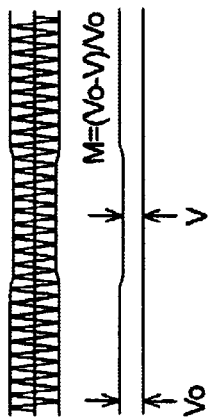
FIG. 11 is a schematic drawing showing a wave form developed in this third embodiment of the present invention.

Reference is now made to FIG. 11 which illustrates the signal being modulated. It can be seen that there is the original voltage level $V_0$ of a larger amplitude, and then at the middle section, a lower voltage level "V" value of a lower amplitude. It is when this low amplitude signal is detected that there is an operative signal which is either the fault or no fault signal, depending upon which subsystem is activated (the green system or the red system).

Figure 12:
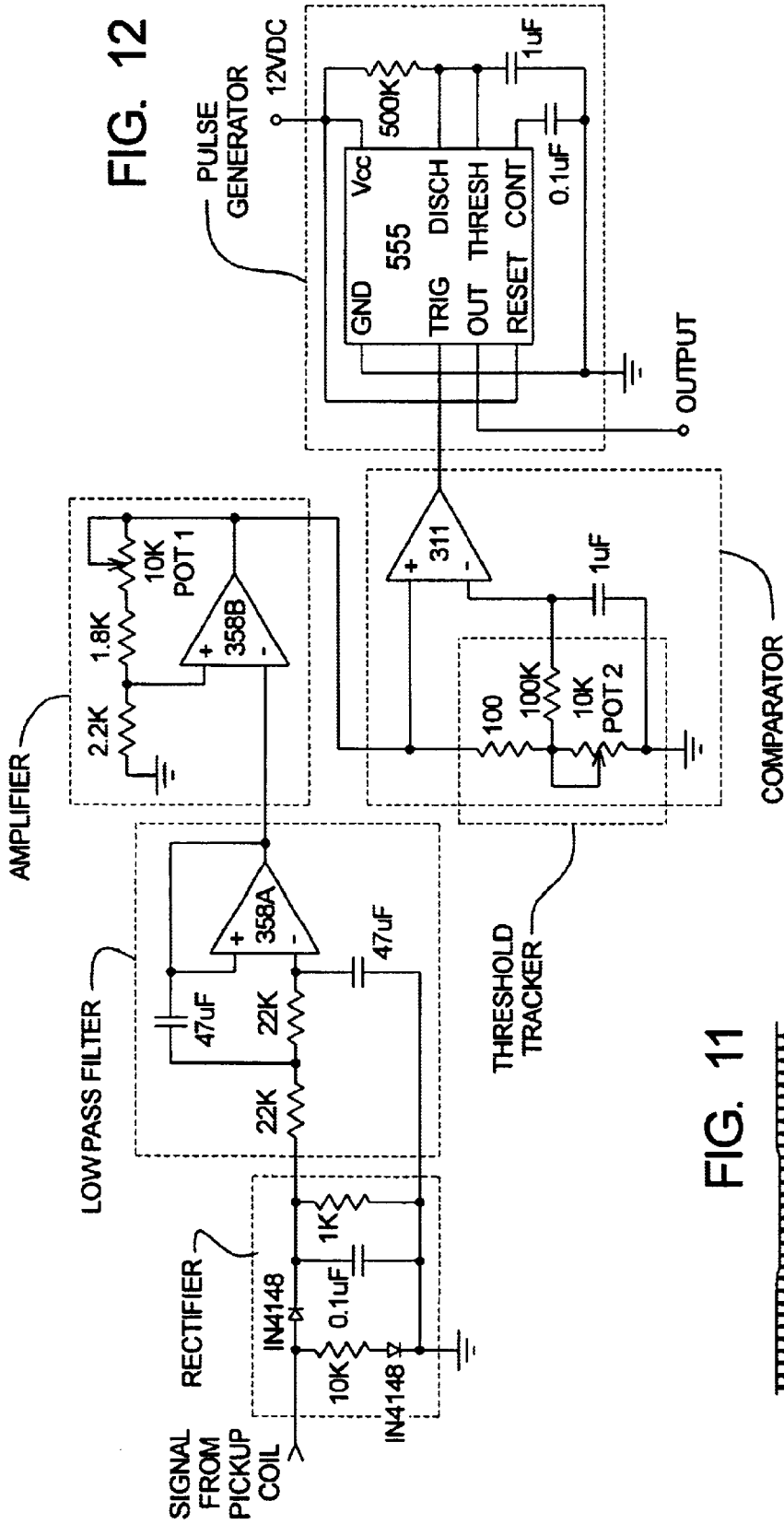
FIG. 12 is a circuit diagram illustrating the third embodiment in more detail.

In FIG. 12, the specific circuit components are shown and the specific circuit components that make up the rectifier 110, with the low pass filter 112, etc. are grouped in broken line enclosures indicating the components that make up that particular main component 110, 112, etc.

With regard to the rectifier 110 in FIG. 12 it can be seen that diodes marked "IN4148" perform the rectifying process, and the capacitor and resistors are used to correct filtering and time constants.

With regard to the low pass filter 112, this is an operational amplifier which has negative feedback in the usual way to provide the low pass active filter effect. As indicated above, this low pass filter is able to remove the noise so as to leave a clean signal.

In the amplifier block 114, there is the next operational amplifier (358B) which functions in the usual way as an amplifier, having the feedback made up of the 1.0K resistor and a 2.2K resistor along with a variable 10K pontentisiometer. The ratio of those resistances determines the gain, and the control of the output is controlled accordingly. Now this results in a clean amplified signal which then goes to the comparator 116. The comparator chosen is the 311 comparator, a very standard, high speed comparator chip. The signal itself goes into the non-inverting positive input. The reference voltage at the inverting input is, intact, controlled by a "threshold tracker", which is indicated at 120 in the block diagram of FIG. 12.

This threshold comparator is indicated in the dotted rectangle of FIG. 12, and this provides a significant advantage in the present invention. Normally, the reference voltage on a comparator is kept a constant value with, for example, a voltage regulator. However, in this case, to overcome problems of drift, this "threshold tracker" is introduced.

This threshold tracker consists of the resistors (100-ohm/ 100K/10K pot) and the one microfarad capacitor. That circuit works in the following way: the 100-ohm and the 10K gives you a variable voltage as a reference, according to their ratio; it's a simple variable voltage divider. So we can adjust how far down from the signal the reference is put, for example. It could be 10%, 1%, or whatever.

The 100-ohm and the 10K pot form a standard, variable voltage divider. It determines the voltage on the reference. As a result, the voltage on the reference will follow faithfully the signal at a certain percentage down, for example. But, we don't allow it to follow when a sensor goes by. In other words, when a pulse, due to a sensor passing, goes by, we're not allowed to have the tracker respond that quickly, otherwise we would eliminate the signal all together. So the tracker, for example, can have a filter that makes it sluggish enough so that we still see the signal as a signal crossing the comparator reference, because it's fast, but we don't see slow variations in the reference voltage because it's always tracking the average signal. The sluggishness, or time constant, of the threshold tracker is determined by the 100K resistor and the 1 microfarad capacitor, with these comprising a low-pass filter which doesn't allow it to respond at too high a frequency. In this case it's actually 60 Hz and that shows that we can have a very rapid tracking process without affecting the signal detection.

To explain further benefits of this threshold tracker, various surrounding circumstances may affect the strength of the signal that is picked up from the fault sensor 24. For example, there could be change in temperature, or the relative positions of the components may change to affect the strength of the signal. Whatever that may be, the threshold tracker will be responsive to the changes in the basic strength of the signal and adjust the comparator accordingly.

To continue now with the review of the operation of the third embodiment of the present invention, the output of the comparator is directed to the pulse generator which comprises a standard 555 timer chip which in this case is hooked up to a simple output generator which is triggered when the 311 comparator goes high. That is to say that when the comparator detects a pulse going by, the output pulse from the generator now goes to the usual audio and LED components or whatever other components are in the monitoring system. For example, there may be a computerized system which would track these signals and initiate the proper remedial action.

It is to be recognized that various modifications could be made to the present invention without departing from the basic concepts of the present invention. For example, the form of the annunciators, the LED's and audio tones, were chosen for the purpose of demonstration. More generally the system would respond via a controlling computer to record events, announce any alarm, display regular operation and stop the belt when damage is confirmed.

What is claimed is:

1. A fault-monitoring and -sensing system to detect a fault condition in a conveyor belt having a longitudinal axis, a transverse axis, and first and second side portions, said monitoring system comprising:
   a) a fault-sensing system comprising a plurality of fault-sensing units at spaced fault-sensing locations along the longitudinal axis of the belt, each of said fault-sensing units comprising:
      i. an electrically conductive fault-responsive component which extends between the side portions of the belt and which has an intact condition in a belt no-fault condition, and a non-intact condition in a belt fault condition;
      ii. a fault-sensing component comprising a fault-sensing circuit operatively connected to the fault-responsive component and arranged to provide no-fault or fault responses corresponding to the intact and non-intact conditions, respectively;
   b) a fault-monitoring section at a fault-detecting location arranged to transmit interrogating signals to said fault-sensing units and to receive the fault or no-fault responses from the sensing unit and to, in turn, generate a reporting signal corresponding to the response or responses from the sensing unit, whereby, as the belt travels and the fault-sensing units pass by the fault-monitoring section, the fault or no-fault condition of the belt at the location of the fault-sensing units is detected.

2. The system as recited in claim 1, wherein said electrically conductive fault-responsive component provides an electrically conductive path extending between first and second side portions of the belt and connecting to said fault-sensing circuit, said fault-sensing circuit having a first operating mode which functions with the conductive path of the fault-responsive component intact to provide said no-fault response, and having a second operating mode which functions with the conductive path of the fault-responsive component in a non-intact condition to provide said second fault response.

3. The system as recited in claim 2, wherein said electrically conductive fault-responsive component comprises a conductive loop having two end connecting portions connecting to the fault-sensing circuit to form a bypass connection, and with the fault-responsive component in its non-intact condition, said electrically conductive path is interrupted and the bypass path becomes nonfunctional.

4. The system as recited in claim 3, wherein said bypass connection is in parallel with at least one circuit component with said fault-sensing circuits.

5. The system as recited in claim 1, wherein said fault-sensing circuit comprises, at least in part, a resonant circuit portion which operates at a first resonant frequency with the fault-responsive component in the intact condition, and operates at a second resonant frequency with the fault-responsive component in the non-intact condition, and said fault-monitoring section has a receiving/responding portion which is responsive to said first and second frequencies in order to generate a reporting signal corresponding to the frequency of the signal received from the fault-sensing component.

6. The system as recited in claim 5, wherein said fault-sensing circuit comprises a coil portion and a capacitance portion, said electrically conductive fault-responsive component has an operative connection with at least said capacitance portion in a manner that in the no-fault condition, the capacitance portion has a first capacitance value, and in the fault condition, the capacitance portion has a second capacitance value in order to provide said first and second frequency outputs.

7. The system as recited in claim 6, wherein said electrically conductive fault-responsive component is in series with at least one capacitor of said capacitance portion.

8. The system as recited in claim 7, wherein said electrically conductive fault-responsive component is in parallel with at least one capacitor of said capacitance portion.

9. The system as recited in claim 1, wherein said monitoring section comprises a detecting section arranged to transmit an interrogating signal which energizes the fault-sensing unit, and said interrogating signal is arranged to energize the fault-sensing circuit in each of a no-fault operating mode of the fault-sensing circuit or in a fault operating mode of the fault-sensing circuit to cause the no-fault or fault response.

10. The system as recited in claim 1, wherein said interrogating signal comprises first and second signal components matching characteristics of the fault-sensing circuit in a no-fault or fault responding operating mode to generate the no-fault or fault response.

11. The system as recited in claim 1, wherein said detecting section is arranged to transmit the interrogative signal having first and second frequency components to energize the fault-detecting circuit operating in first or second frequency modes to transmit a no-fault response or a fault corresponding to said first and second frequencies, respectively.

12. The system as recited in claim 1, wherein said fault-monitoring section is arranged to transmit said interrogated signal or signals as a wave form having at least first and second frequency components, and said fault-sensing circuit has a resonant frequency portion which operates at a first resonant frequency with the fault-responsive component in the intact condition, and operates at a second resonant frequency with the fault-responsive component in the non-intact condition, said system being characterized so that when one of the fault-sensing units is in proximity to the fault-monitoring section, when the fault-sensing circuit is operating at the first resonant frequency with the fault-responsive component in the intact condition, the resonant circuit portion draws energy from the first frequency component of the monitoring section, and when the fault-sensing circuitry is operating at the second resonant frequency with the fault-responsive component in the non-intact condition, energy is drawn from the second frequency component of the fault-monitoring section; said fault-monitoring section being arranged to generate a reporting signal of the no-fault or fault condition in response to the change in the energy level of either the first or second frequency components of the fault-monitoring section.

13. The system as recited in claim 12, wherein said system further comprises a signal-processing section operatively connected to the fault-monitoring section to receive reporting signals from the fault-monitoring section of first and second frequencies, said signal-processing system being arranged to detect a decrease in amplitude of the reporting signal of either the first or second frequency to ascertain a fault or no-fault condition, said signal-processing section being arranged to transmit a further signal indicating a fault or no-fault condition.

14. The system as recited in claim 13, wherein said signal processing section comprises a rectifier to rectify the reporting signals from the fault-monitoring section and a comparator to compare the rectified signal with a reference signal to provide the signal.

15. The system as recited in claim 14, wherein said signal-processing section comprises a low-pass filter to receive the signal from the rectifier, an amplifier to amplify the signal from the low-pass filter, with an amplified signal from the amplifier being directed to the comparator, and there is a threshold generator that is responsive to the strength of the signals generated by the monitoring section to establish a reference signal corresponding to the strength of the signals from the monitoring section, so that the reference signal has a proportional relationship to the signals generated from the fault-monitoring section.

16. The system as recited in claim 1, wherein said fault-monitoring section comprises a detecting section having first and second detecting subsections which operate at said first and second frequencies, respectively, each detecting subsection comprising a driver section which provides a driver signal to a driver coil, a resonant idler section coupled to the coil of said driver, and a pickup coil coupled to the idler section, with said pickup coil providing an output signal.

17. A method of detecting a fault condition in a conveyor belt having a longitudinal axis, a transverse axis, and first and second side portions, system comprising:
   a) positioning a plurality of fault-sensing units at spaced fault-sensing locations along the longitudinal axis of the belt, with each of said fault-sensing units comprising:
      i. an electrically conductive fault-responsive component which extends between the side portions of the belt and which has an intact condition in a belt no-fault condition, and a non-intact condition in a belt fault condition;

ii. a fault-sensing component comprising a fault-sensing circuit operatively connected to the fault-responsive component and arranged to provide no-fault or fault responses corresponding to the intact and non-intact conditions, respectively;

b) moving said belt along a belt traveling path aligned with said longitudinal axis, with the fault-sensing components being positioned to move along a monitoring path;

c) positioning a fault-monitoring section at a monitoring location adjacent to the monitoring path;

d) transmitting interrogating signals to said fault-sensing units as the units are passing by the monitoring location initiate the fault or no-fault responses from the sensing unit and, in turn, generating a reporting signal corresponding to the response or responses from the sensing unit, whereby, as the belt travels and the fault-sensing units pass by the fault-monitoring section, the fault or no-fault condition of the belt at the location of the fault-sensing units is detected.

18. The method as recited in claim 17, wherein said electrically conductive fault-responsive component provides an electrically conductive path extending between first and second side portions of the belt and connecting to said fault-sensing circuit, said method further causing said fault-sensing circuit to operate in a first operating mode with the conductive path of the fault-responsive component intact to transmit said no-fault response, or causing said fault-sensing circuit to operate in a second operating mode with the conductive path of the fault-responsive component in a non-intact condition to transmit said second fault response.

19. The method as recited in claim 18, wherein said electrically conductive fault-responsive component comprises a conductive loop having two end connecting portions connecting to the fault-sensing circuit to form a bypass connection, and with the fault-responsive component in its non-intact condition, said electrically conductive path is interrupted and the bypass connection becomes nonfunctional, with said bypass connection being in parallel with at least one circuit component of said fault-sensing circuits.

20. The method as recited in claim 17, wherein said fault-sensing circuit comprises, at least in part, a resonant circuit portion, said method comprising operating causing said resonant circuit portion to respond at a first resonant frequency with the fault-responsive component in the intact condition, and at a second resonant frequency with the fault-responsive component in the non-intact condition.

\* \* \* \* \*